July 4, 1967  G. C. WALLIS, JR  3,328,977
SPEEDOMETER ASSEMBLY
Filed Oct. 24, 1965  3 Sheets-Sheet 2

GEORGE C. WALLIS, JR
INVENTOR.

BY
John R. Faulkner
Keith L. Zerschling
ATTORNEYS

July 4, 1967

G. C. WALLIS, JR 3,328,977

SPEEDOMETER ASSEMBLY

Filed Oct. 24, 1965

GEORGE C. WALLIS, JR
INVENTOR.

BY
John R. Faulkner
Keith L. Zerschling
ATTORNEYS

United States Patent Office 3,328,977
Patented July 4, 1967

3,328,977
SPEEDOMETER ASSEMBLY
George C. Wallis, Jr., Livonia, Mich., assignor to Ford Motor Company, Dearborn, Mich., a corporation of Delaware
Filed Oct. 24, 1965, Ser. No. 504,663
5 Claims. (Cl. 64—4)

This invention relates to a speedometer assembly for an automotive vehicle and more particularly to a quick connect and disconnect coupling for connecting and disconnecting the speedometer cable with a driven shaft of a speed indicating means.

In a conventional speedometer assembly or system for an automotive vehicle, a speed indicating means or meter is mounted in the instrument panel for viewing by the vehicle operator. A flexible cable having an external sheath and a rotatably mounted internal flexible drive member is coupled at one end to a gear driven by the vehicle drive shaft. The other end is coupled to a driven shaft of the speed indicating means or meter. This is ordinarily done by means of a threaded cup coupled to the sheath of the speedometer cable adjacent the speedometer with the threads of the cup engaging a tubular support member for the driven shaft of the speed indicating means or meter. This driven shaft slidably but nonrotatably receives the end of the flexible drive member of the speedometer cable.

It can be readily appreciated that this arrangement is inconvenient and that it consumes substantial time during assembly operations when the speedometer cable is coupled to the speedometer itself (the speed indicating mechanism or meter previously referred to) because exact alignment must be maintained between the speedometer cable and the cooperating parts of the speed indicating means or meter. In addition, room must be provided for the assembler to turn or rotate the threaded cup. It is also time consuming to disassemble the speedometer assembly should this be necessary for repair work or replacements of the speedometer cable or components in the speedometer. Often there is not sufficient room for this to be readily accomplished in an automotive vehicle.

The present invention remedies the above-described difficulties by providing a quick connect and disconnect coupling for connecting and disconnecting the speedometer cable with the speed indicating means or meter. It also provides a means in which the speedometer cable including the sheath and flexible drive member are automatically and properly aligned with respect to the driven shaft of the speed indicating means or meter. Another feature of the invention provides for front removal of the speed indicating means or meter without disconnecting the speedometer cable from the remainder of the assembly.

The quick connect-disconnect coupling of the invention comprises a first tubular portion that is positioned around and is affixed to the sheath of the speedometer cable adjacent one end thereof. A second tubular portion of larger diameter is coupled to the first portion by a set of flexible arms, and this second portion has an internal or radially inwardly extending tongue that engages a depression or groove in a rearwardly extending portion of the frame of the speed indicating means or meter or a rearwardly extending housing that rotatably supports the driven shaft of the speed indicating means or meter. This second tubular portion is sufficiently large that radial pressure on a portion of it opposite the tongue will readily disengage the tongue from the depression or groove and permit the speedometer cable to be quickly disconnected from the speed indicating means or meter. During assembly operations, this tongue readily rides over a portion of the tubular portion of the frame or tubular section that rotatably supports the driven shaft of the speed indicating means or meter upon an axial force being exerted upon the speedometer cable. The tongue then automatically finds its way into the groove or depression to lock the speedometer cable to the speed indicating means or meter. As in the conventional system, the driven shaft of the speed indicating means slidably but nonrotatably receives the end of the flexible drive member of the speedometer cable.

An important feature of the invention is also the provision of an enlarged end portion of the sheath of the speedometer cable that is located or piloted by sliding into or over a complementary-shaped member of the speed indicating means or meter. This complementary-shaped member also concentrically supports the driven shaft of the speed indicating means or meter so that all of these components are properly aligned in a concentric arrangement both during operation of the speedometer assembly and during assembly and disassembly through the operation of the quick connect and disconnect coupling.

An object of the invention is the provision of a quick connect and disconnect coupling means for connecting and disconnecting a speedometer cable with a speedometer mechanism that includes a speed indicating means or meter.

Another object of the invention is the provision in conjunction with the above-mentioned quick connect and disconnect coupling of means for properly concentrically locating the necessary elements of the coupling between the speedometer cable and the speed indicating means or meter.

A further object of the invention is the provision of a means in conjunction with the quick connect and disconnect coupling that permits the removal of the speed indicating means or meter without the necessity of disconnecting the cable from the supporting structure of the speed indicating means or meter.

Other objects and attendant advantages of the present invention may be more readily realized when the specification is considered in connection with the attached drawings in which.

Figure 1:
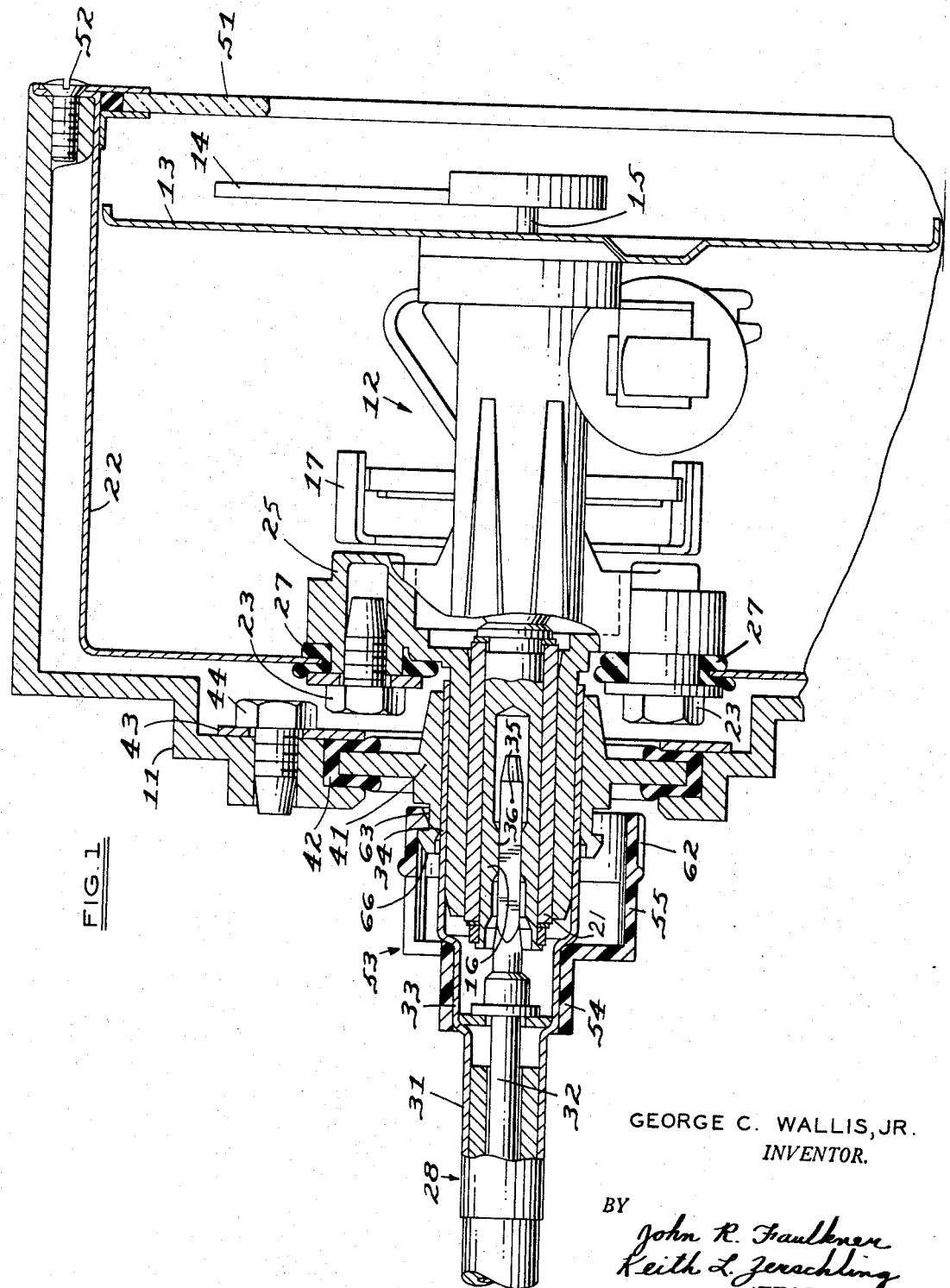
FIGURE 1 is a sectional view, partially in elevation, of a speedometer assembly of the present invention.
Figure 2:
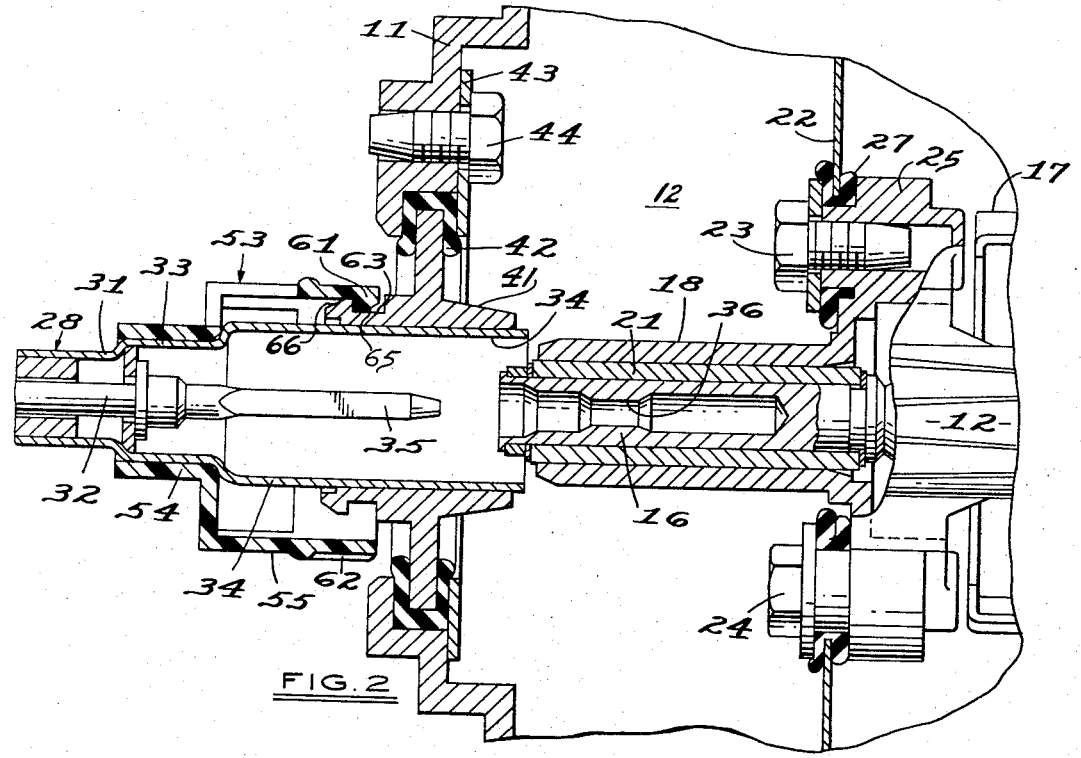
FIGURE 2 is a view similar to FIGURE 1 but showing the removal of the speed indicating means or meter from the assembly.

Referring now to the drawings in which like reference numerals designate like parts throughout the several views thereof, there is shown in FIGURES 1 and 2 one embodiment of the speedometer assembly of the present invention. This assembly comprises a frame member 11 generally enclosing a speed indicating means or meter 12 of the standard eddy-current-cup type well known in the art. This speed indicating means or meter has a dial 13 positioned in spaced relationship behind a speed indicating needle 14 that is driven by a shaft 15. The shaft 15 is, in turn, driven by driven shaft 16 of the speed indicating means or meter through a conventional eddy-current-cup mechanism 17.

The driven shaft 16 is rotatably mounted in a rearwardly extending tubular member 18 through a journal bearing 21. The rearwardly extending tubular member 18 is joined to a housing member 22, preferably made of sheet metal, by means of machine bolts 23 and 24 that are received in a radially extending flange 25. As shown, the housing member 22 may be isolated from the flange 25 by means of an elastomeric grommet 27.

A speedometer cable 28 comprising an outer flexible sheath 31 and an inner flexible drive member 32 rotatably supported in the sheath 31, is adapted to be driven by the drive shaft of the automotive vehicle as is conventional in the art. It can be appreciated that the end of the speedometer cable 28 not shown on the drawing would carry a gear that drives the flexible drive member 32 from the drive shaft of the vehicle at a speed proportional to the speed of the vehicle. As shown in FIGURES 1 and 2, the flexible sheath 31 has a first enlarged tubular portion 33 and a second enlarged tubular portion 34 extending over and around a flat or square portion 35 of the flexible drive member 32 which is slidably received in a complementary-shaped opening 36 in the driven shaft 16 so that rotation of the flexible drive member 32 will drive the driven shaft 16 of the speed indicating means or meter 12.

The frame member 11 includes a central tubular member 41 that is supported within the main body portion of the frame 11 by means of an elastomeric grommet 42 and an annular plate 43 that engages the elastomeric grommet 42 and is affixed to the frame by a plurality of bolts, one of which is shown at 44. As can be appreciated by an inspection of FIGURES 1 and 2, the enlarged tubular portion 34 of the sheath 31 of the speedometer cable 28 is received within the tubular member 41 of the frame 11, and this tubular member 41 locates and pilots the enlarged tubular portion 34 of the speedometer cable sheath. Additionally, the rearwardly extending tubular member 18 that rotatably supports the driven shaft 16 of the speed indicating means or meter 12 is received within the enlarged tubular portion 34 of the speedometer cable sheath 31, and it thereby locates and pilots the driven shaft 16 with respect to the flat or square end portion 35 of the flexible drive member 32.

As shown in FIGURE 1, the housing 22, made of sheet metal and including a front glass plate 51, is removably mounted in the frame 11 by means of screws, one of which is shown at 52.

Figure 4:
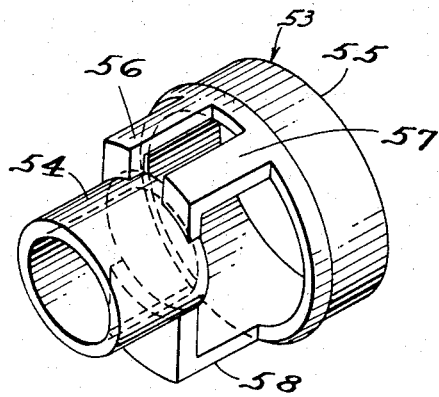
FIGURE 4 is a perspective view of one embodiment of the quick connect-disconnect coupling of the present invention.
Figure 5:
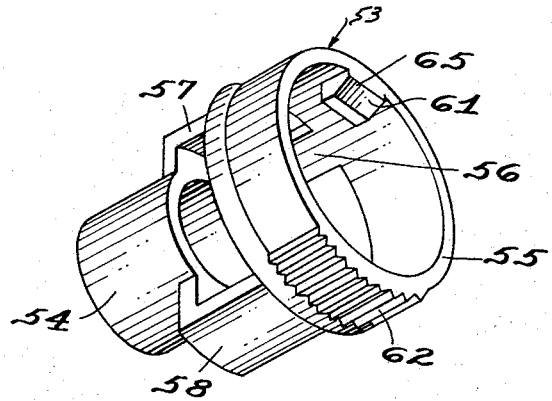
FIGURE 5 is a perspective view taken from another position of the coupling shown in FIGURE 4.

A flexible coupling member generally designated by the numeral 53 is used or employed to connect and disconnect the speedometer cable 28 with the speed indicating means or meter 12 in a novel and rapid way. This flexible coupling member is shown in section in FIGURES 1 and 2 and in perspective in FIGURES 4 and 5. It is preferably an integrally molded plastic piece comprising a first tubular portion 54 and a second tubular portion 55 of substantially larger diameter than the first tubular portion 54. The second tubular portion 55 is preferably radially offset with respect to the first tubular portion 54 or, stated another way, these two tubular portions are eccentric with respect to one another, with the walls thereof being generally parallel. These two tubular portions 54 and 55 are joined by flexible arms 56, 57 and 58 as shown in FIGURES 4 and 5.

A tongue 61 is formed on the internal diameter of the second tubular portion 55 of the flexible coupling member 53 and in a position such that the two axes of the tubular portions 54 and 55 lie in a plane that passes through this tongue with the axis of the second tubular portion 55 being located opposite the tongue from the axis of the first tubular portion 54. It can be appreciated, therefore, that radial pressure applied on the knurled portion 62 of the second tubular portion 55 in a direction toward the tongue 61 will move this tongue radially with respect to the first tubular portion 54.

Referring back to FIGURES 1 and 2 specifically, it can be seen that the outer diameter of tubular portion 41 of the frame has a depression positioned therein, preferably in the form of an annular groove 63 that receives the tongue 61. The groove 63 and the tongue 61 have complementary faces positioned generally perpendicular to the axes of the tubular portions 54 and 55 of the flexible coupling member 53 and to the axis of the other tubular members of the frame and tubular portions of the sheath 31 of the speedometer cable 28. The tongue 61 and the tubular member 41 of the frame 11 may also have complementary beveled edges 65 and 66 that facilitate the connecting of the speedometer cable 28 to the speed indicating means or meter 12.

It can be appreciated from an inspection of FIGURES 1 and 2 that the first tubular portion 54 of the flexible coupling member 53 is affixed to the first enlarged tubular portion 33 of the speedometer cable sheath 31 and that the second tubular portion 55 extends forwardly over and surrounds the second tubular portion 34 of the sheath 31. Therefore, when the speedometer cable 28 is to be assembled in relation to the speed indicating means or meter 12, the flat or square end portion 35 of the flexible drive member 32 is inserted within the complementary-shaped opening 36 in the driven shaft 16, and the second enlarged tubular portion 34 of the speedometer cable sheath 31 is inserted within the internal diameter of the tubular portion 41 of the frame 11 and around the tubular member 18 that rotatably supports the driven shaft 16. Thereafter, axial force is asserted on the speedometer cable 28, and the members just previously described slide into engagement. As this happens, the beveled surfaces 66 on the tubular member 41 and 65 on the tongue 61 of the flexible coupling member 53 cooperate to move the second tubular portion 55 radially with respect to the first tubular portion 54 through the action of the flexible arms 56, 57 and 58 so that the tongue 61 may ride over the beveled surface 66 and lock into engagement with the depression or annular groove 61 positioned in the outer diameter of tubular member 41.

An alternate method of assembly is readily apparent from an inspection of FIGURE 2. In this alternate method, the speed indication means 12 including housing 22 is not initially mounted in the frame 11. The first step in assembly is to insert the second enlarged tubular portion 34 of the speedometer cable sheath 31 into the tubular member 41 of the frame 11 and thereafter axial force is exerted on the speedometer cable 28 to lock the tongue 62 of the flexible coupling 53 in the depression or annular groove 63 in the tubular member 41. The speed indicating means or meter 12 including the housing 22 is then inserted in the frame 11, with the second enlarged tubular portion 34 of the flexible sheath 28 receiving the tubular portion 18 that rotatably supports the driven shaft 16 and with the flat or square end portion 35 of the flexible drive member 32 of the speedometer cable 28 being received within the complementary-shaped opening 36 in the driven shaft 16. Thereafter, the screws 52 as shown in FIGURE 1 are employed to secure the speed indicating means or meter 12 in the frame 11 through the sheet metal housing 22.

If for any reason the speedometer cable 28 needs to be disconnected from the speed indicating means 12 for repair purposes or otherwise, radial pressure is applied to the knurled portion 62 on the second tubular portion 55 of the flexible coupling 53, and this second tubular portion 55 moves radially with respect to the first tubular portion 54, through the action of the flexible arms 56, 57 and 58, thereby lifting the tongue 61 from the annular groove 63 in the tubular member 41. Thereafter, an axial pull on the speedometer cable 28 is all that is necessary to remove the speedometer cable from the speed indicating means or meter 12.

It can also be appreciated that with this structure the speed indicating means 12 may be removed through the front of the instrument panel of the vehicle by removing the screws 52 and merely pulling the whole speed indicating means or meter 12 forward in an axial direction as shown in FIGURE 2. The speedometer cable, however, remains in position with respect to the frame 11 as shown in FIGURE 2 so that the speed indicating means or meter 12 may be reinserted within the frame 11 without difficulty. The proper alignment is maintained between all the components of the speedometer cable 28 and the components of the speedometer indicating means 12 including the driven shaft 16. As a result, when the extending tubular portion 18 is reinserted within the tubular portion 34 of the speedometer cable sheath 31, the flat or square end portion 35 of the flexible drive member 32 will be in proper alignment with and will move into the complementary opening 36 in the driven shaft 16.

Figure 3:
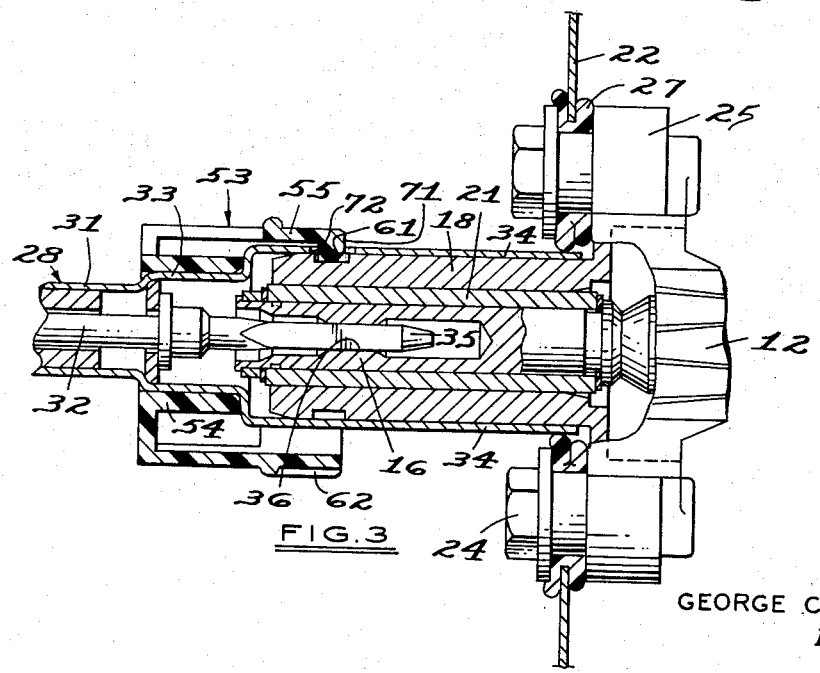
FIGURE 3 is a sectional view, partially in elevation, of another embodiment of the speedometer assembly of the present invention.
Figure 6:
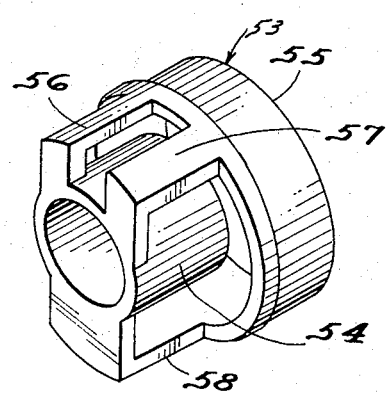
FIGURE 6 is a perspective view of another embodiment of the quick connect-disconnect coupling of the present invention.
Figure 7:
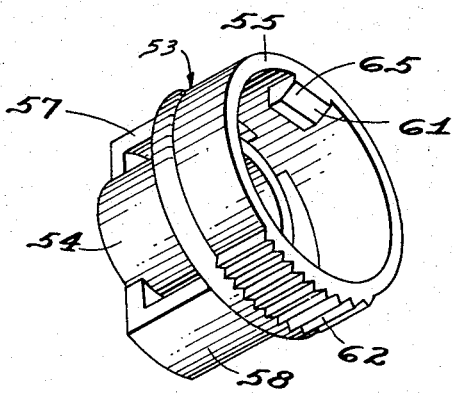
FIGURE 7 is a perspective view of the coupling shown in FIGURE 6 taken from a different position.

Another embodiment of the invention is shown in FIGURE 3, and another embodiment of the flexible coupling member 53 that is employed in conjunction with the embodiment of the invention shown in FIGURE 3 is shown in perspective in FIGURES 6 and 7. In FIGURE 3 a depression preferably in the form of an annular groove 71 is formed in the rearwardly extending tubular member 18 rather than in a separate tubular portion of the frame as shown in FIGURES 1 and 2, and the second enlarged tubular portion 34 of the sheath 31 of the speedometer cable 28 has an aperture 72 for receiving the tongue 61 of the flexible coupling member 53. The flexible coupling member 53 as shown in FIGURES 6 and 7 differs from that shown in FIGURES 4 and 5 in having the first tubular member 54 extending from the flexible arms 56, 57 and 58 in a direction toward the second tubular portion 55 rather than away from it as was the case with the embodiments shown in FIGURES 1, 2, 4 and 5.

It can readily be appreciated that the operation of the embodiment of the invention shown in FIGURE 3 in providing a quick connect and disconnect coupling for the speedometer cable 28 is the same as with the embodiment shown in FIGURES 1 and 2. The embodiment shown in FIGURE 3 also has all of the locating and piloting features of the embodiment shown in FIGURES 1 and 2. The embodiment shown in FIGURE 3, however, does not permit the speed indicating means or mechanism 12 to be removed from the instrument panel without disturbing the position of the speedometer cable 28 in the instrument cluster or panel as is the case with the embodiments of FIGURES 1 and 2.

It can be readily appreciated, therefore, that the present invention provides a simple and reliable quick connect and disconnect coupling in a speedometer assembly. In assembling the speedometer, the speedometer cable may be coupled to the speed indicating means merely by locating the speedometer cable properly and exerting an axial force on it. In disconnecting the speedometer cable from the speed indicating means only very simple hand manipulations are necessary. The first of these is a radial pressure applied to the knurled portion of the flexible coupling member and the second is an exertion of an axial pull on the speedometer cable. Furthermore, the invention provides for locating and piloting means between the speedometer cable and the speed indicating means that readily facalitates these operations. The invention also provides for means for removal of the speed indicating means from the instrument cluster without disturbing the relationship of the speedometer cable to that cluster so that the speed indicating means may thereafter be readily reinserted without need for access to the rear portion of this cluster.

It is to be understood that this invention is not to be limited to the exact construction shown and described, but that various changes and modifications may be made without departing from the spirit and scope of the invention as defined in the appended claims.

What is claimed is:

1. A speedometer assembly for an automotive vehicle comprising a speedometer cable having an outer sheath and a flexible drive member rotatably mounted within said outer sheath, a speed indicating member having a shaft, a frame having means for rotatably mounting said shaft in said frame member and including an outer cylindrical member having an annular groove positioned within the outer periphery thereof, said shaft having an internal opening slidably and non-rotatably receiving the end of said flexible drive member, and a flexible coupling member having a first tubular portion affixed to said sheath and a second tubular portion having a larger diameter than said first cylindrical portion and flexible means coupling said first and said second tubular portions for permitting radial displacement of said second tubular portion with respect to said first tubular portion, said second tubular portion having an internal tongue engaging said annular groove in said outer tubular member of said frame whereby said speedometer cable may be disconnected from said shaft by radial pressure on said second tubular portion of said flexible coupling member in a position opposite said tongue to remove said tongue from said internal groove and by thereafter exerting an axial force on said speedometer cable.

2. The combination of claim 1 in which said internal tongue has a beveled front edge and a rear edge having a surface generally perpendicular to the axis of said second tubular portion of said flexible coupling member and said annular groove has a rear wall lying in a plane generally parallel to said rear edge of said internal tongue.

3. The combination of claim 1 in which the axis of said second tubular portion of said flexible coupling member is parallel to but offset with respect to the axis of said first tubular portion, with the axis of said second tubular portion lying in a plane passing through said tongue and the axis of said first tubular portion and being positioned on the side of the axis of said first tubular portion opposite said tongue.

4. A speedometer assembly for an automotive vehicle comprising a speedometer cable having a flexible outer sheath and a flexible drive member rotatably mounted within said flexible outer sheath, said outer sheath having an enlarged tubular end portion, a speed indicating member having a shaft, a frame, said speed indicating means being mounted in said frame, said frame including a hollow tubular member rotatably supporting said shaft and nonrotatably receiving said enlarged tubular end portion of said flexible cable on the outer periphery thereof, whereby said flexible outer sheath, said flexible drive member, and said shaft are coaxially positioned relative to one another, said shaft having an internal opening slidably and nonrotatably receiving the end of said flexible drive member, a flexible coupling member having a first tubular portion surrounding and affixed to the outer diameter of said sheath, a larger radially offset tubular portion extending over said hollow tubular member of said frame and flexible arms interconnecting said first and said second mentioned tubular portions, said second mentioned tubular portion having an internal tongue positioned on the portion thereof most closely adjacent the first mentioned tubular portion of said flexible coupling, said hollow tubular member of said frame having an annular groove positioned therein receiving said finger whereby said speedometer cable may be disconnected from said shaft by radial pressure on said offset tubular portion in a position opposite said tongue to disengage said tongue from said annular groove and thereafter applying an axial force on said sheath relative to said frame.

5. In a speedometer for an automotive vehicle, a speed indicating means having a tubular member, a speedometer drive shaft rotatably mounted in said tubular member, said tubular member having a depression located in the outer periphery thereof, a speedometer cable having an outer sheath and a drive member rotatably supported in said outer sheath, said drive shaft having an internal opening slidably and nonrotatably receiving said drive member of said speedometer cable, a plastic integrally molded quick connect and disconnect coupling for speedometer cable to said drive shaft comprising a first tubular portion surrounding and affixed to a portion of said sheath adjacent one end thereof, and a second tubular portion eccentric with respect to said first tubular portion and flexibly joined thereto by flexible arm means permitting radial movement of said second tubular portion with respect to said first tubular portion, an internal tongue on the internal portion of said second tubular portion most closely adjacent said first tubular portion in a radial direction, said tongue being positioned within said depression in said tubular member of said frame and being shaped to prevent axial movement of said speedometer cable with respect to said drive shaft and tubular member when said tongue is so positioned.

References Cited
UNITED STATES PATENTS

| | | | |
|---|---|---|---|
| 2,872,793 | 2/1959 | Botti | 64—4 |
| 2,893,221 | 7/1959 | Bell | 64—4 |
| 3,234,757 | 2/1966 | Stadelmann | 64—4 |
| 3,287,980 | 11/1966 | Gilliland | 64—4 X |

FRED C. MATTERN, Jr., *Primary Examiner.*

H. C. COE, *Assistant Examiner.*